May 30, 1944.  A. R. BURNETTE  2,349,938
MEANS FOR SEPARATING EXPANSIBLE FLUID
FROM NONEXPANSIBLE FLUID
Filed July 17, 1941  2 Sheets-Sheet 1
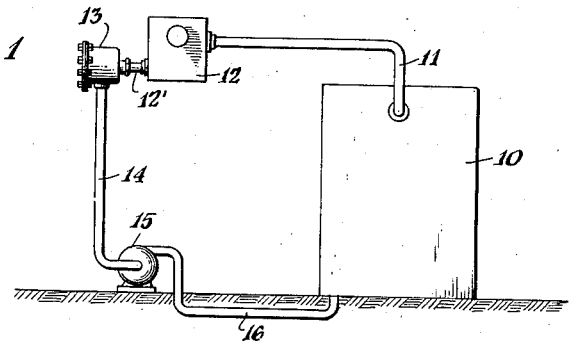
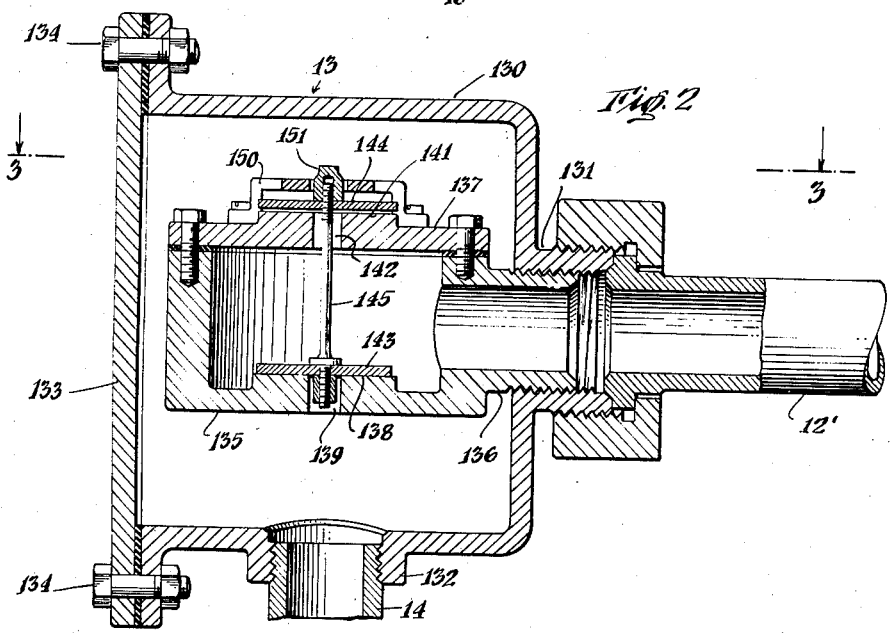
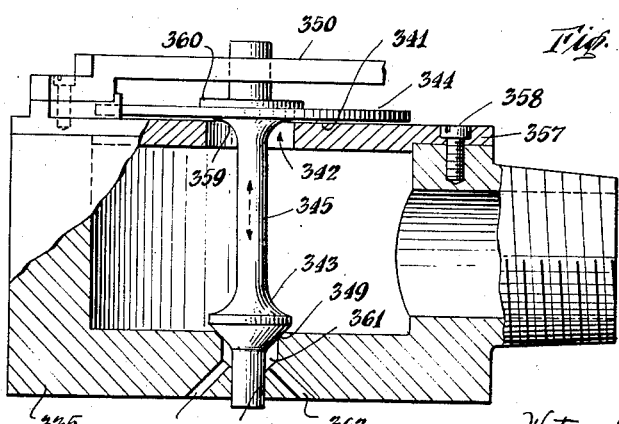
INVENTOR.
BY Algernon Rex Burnette
Watson, Bristol, Johnson & Leavenworth
ATTORNEYS

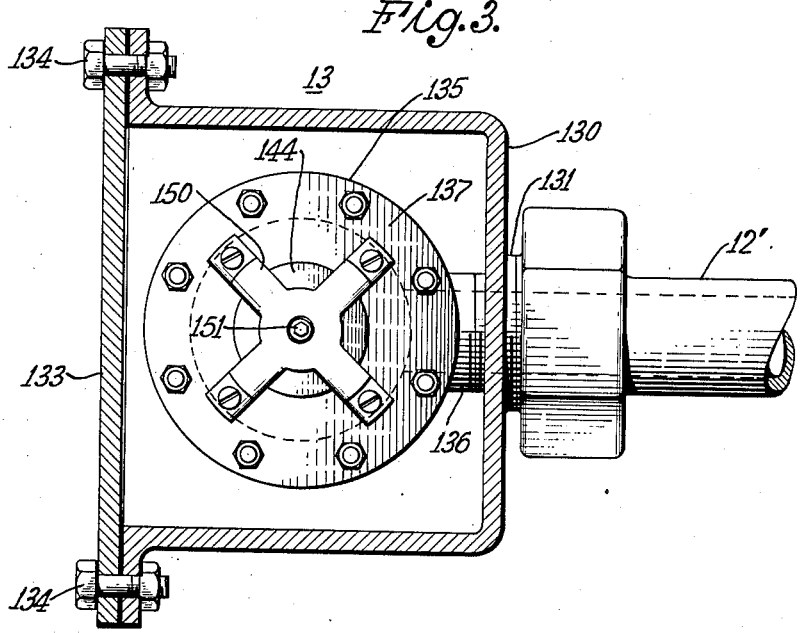
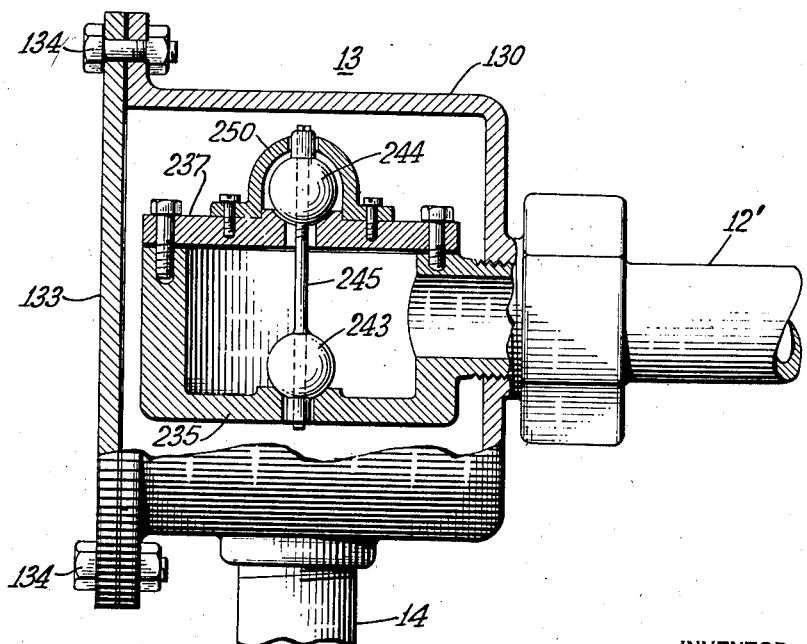

Patented May 30, 1944

2,349,938

UNITED STATES PATENT OFFICE 2,349,938

MEANS FOR SEPARATING EXPANSIBLE FLUIDS FROM NONEXPANSIBLE FLUIDS

Algernon R. Burnette, New York, N. Y.

Application July 17, 1941, Serial No. 402,788

5 Claims. (Cl. 137—103)

This invention relates to means for separating expansible fluids, such as steam, from non-expansible fluids, such as water. More specifically, the invention relates to improved devices for separating water and steam, such as traps, adapted for service in high pressure steam power systems as well as in low pressure systems.

The invention has for its object generally the provision of an improved device for the purposes indicated which is relatively inexpensive to manufacture and efficient and reliable in operation.

The type of trap disclosed in U. S. Patent to Brown 1,089,187, dated March 3, 1914, has enjoyed some commercial success, although its field of utility has been practically limited to low pressures and even in that field certain necessities of its design have curtailed its use. The device of the present invention might be said to fall in the broad category of the Brown type, but by reason of new elements and new combinations and arrangements the present device is distinctive and possesses unique advantages and greatly enlarged useful applicability.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

Fig. 1 is a diagrammatic view showing a steam power system provided with a trap, in accordance with the invention;

Fig. 2 is a vertical sectional view, on a larger scale, showing one embodiment of the invention;

Fig. 3 is a horizontal section, taken on the line 3—3 in Fig. 2;

Fig. 4 is a view, mainly in vertical section, showing a modified form of trap device in accordance with the invention; and Fig. 5 is a similar view of another modification.

Referring now to the drawings, and particularly to Figs. 1 to 3, a steam generator is diagrammatically shown at 10, which has a steam supply main 11 provided with a chamber 12 in which water of condensation may collect. Attached to a lower portion of chamber 12 by means of connection 12' is a trap 13 which has a return connection 14 leading therefrom to a suitable pump, here shown as a turbine type pump 15, which discharges into connection 16 for returning the water to the generator.

Details of a preferred construction for trap 13 are shown in Fig. 2 and comprise a casing member 130 which has an inlet 131 in the form of a nipple that is adapted to be connected to connection 12' to receive steam and/or water from chamber 12. The casing member 130 similarly has an outlet 132 in the form of a threaded nipple into which pipe connection 14 may be screwed or otherwise attached. Access to the interior of the casing member 130 is had by means of a detachable plate or cover 133, which is secured in place in any suitable manner, for example, by a packing ring and bolts, as shown at 134.

The means for separating steam from water are disposed in the casing member 130 and comprises a chambered member 135 which has an inlet nipple 136 arranged to communicate with and be supported by inlet 131. This may be achieved in any convenient manner, for example, by arranging the nipple 136 for threaded engagement with a thread formed interiorly in the inlet 131, as shown.

Chambered member 135 may have any convenient shape; a drum shape, as indicated in Figs. 2 and 3, is a convenient shape, such drum preferably having a removable top portion in the form of a separate plate or cover 137. Thus access is readily had to the interior of chambered member 135 for cleaning and also for machining, such manufacturing step being preferably employed to provide an interior smooth flat valve seat 138 having an opening 139 in the lower wall of the chambered member.

The plate or cover 137 is also provided externally with a smooth flat valve seat 141 and has a valve opening 142 therein that is arranged to be in line with that at 139. The diameter of opening 142 is somewhat greater than that of opening 139, as will be explained.

A pair of valve members or disks, 143 and 144, are mounted on stem 145 and arranged so that disk 143 will be set on face 138 while disk 144 is spaced a predetermined distance off face 141, allowing thereby an annular opening between the latter disk and face for normally permitting slight leak of expansible fluid. These disks thus mounted are adapted to rise and fall simultaneously, but are otherwise free from mechanical restraint. To limit their upward motion away from their seats, there is mounted a spider 150 on the top side of plate 137. The spider 150 has its central portion recessed to pass freely a pintle nut 151 that is on top of stem 145 and locks the valve disk 144 in desired adjusted position thereon; there being a similar nut on the bottom for valve disk 143.

This described method of construction shows a practical means of attaining the results desired but does not limit the invention to this particular detailed means.

The valve disks 143 and 144 are shown as similarly formed and similarly weighted so as to give a substantially balanced effect on the fluid being passed through the chamber 135. There may, however, be a modification of these sizes for the purpose of varying the closing force of the valve by the effect of an expansible fluid under different circumstances of the particular installation. It has been found that the larger disk 144 is in diameter, the greater the closing effect. This does not apply to disk 143 so that this disk may be smaller in diameter than 144 in given instances. As noted above, valve disk 143 is designed to set on the face 138 when the valve is closed, but as an actual matter of operation there may be a seepage of pressure around the edges and any such pressure will add to the total upward forces. The excess in diameter of the top opening 142 over that of the bottom opening 139 is such that the pressure of a non-expansible fluid acting on the valve disks gives a resultant upward force sufficient to maintain open these valves when subjected to the non-expansible fluid. The extent of difference of effective areas against which the non-expansible fluid exerts pressure to raise valve 144 and exerts pressure to close valve 143 is preferably designed in relation to the range of pressure for which the device is intended, and it will be understood that devices for use at higher pressures will have lesser difference between such areas than devices for uses nearer atmospheric pressure, so that in all cases closure is insured by expansible fluid escape.

The diameters of the openings for passing inexpansible fluid, in accordance with the invention, are preferably made relatively large, and this desirable form is permitted due to the operation as described. Such diameters are taken of sufficient value to give a desired rate of flow and thus also to avoid all liability of becoming clogged by foreign matter that may be carried by either fluid component as well as increase the capacity of the trap.

The diameter of the valve disk 144 together with its seat here employed is such that when in open position, there is sufficient space in which the expansible fluid or steam when passing may expand to an extent which provides a relatively negative pressure effect, and which operates to insure the quick and positive closing of the valve to limit to a minimum the passage of steam or the like.

Tests have shown that when installed as indicated, the trap here provided operates mechanically to separate expansible fluid from non-expansible fluid, closing to the expansible fluid but opening to the non-expansible. The expansible fluid, when passing outwardly between the valve disk 144 and the surface of its seat at the top of the chambered member 135, provides a fluid body which assumes an increasing volume of appreciable velocity hence decreasing pressure. The pressure decreases to an extent below that generally in the casing 130, for example, atmospheric, and hence permits the latter pressure to close the valve. However, when a non-expansible fluid comes in contact with the valve, the static pressure unseats the valve and allows the non-expansible fluid to escape. In such case, it will be understood that the escaping water, or the like, does not expand and does not cause a relatively lower pressure on the inside of valve 144 than on the outer surface. The valve thus remains open during discharge of the liquid only.

With the use of nearly balanced valves, in accordance with the invention, the slight excess in area exposed to upward pressure causes the valve to open under the static pressure of the non-expansible fluid; and the later reduction in total upward pressure during the passage of expansible fluid is adequate to effect the closing movement.

The trap here provided is adapted to operate both in high pressure and low pressure fields, and is not limited to the use of valve openings of small diameter and is freed from difficulties arising from clogging of such valve openings by foreign matter.

In the modified form of the invention illustrated in Fig. 4, a chambered member 235 is provided in the casing 130, of a form somewhat different from that at 135. This second member has a removable head or closure plate 237 and one internal and one external valve seat. These seats are spherically formed instead of plane and are adapted to seat spherical valve members 243 and 244 which are mounted on a stem 245 by which the simultaneous movement of the valves is insured; there being an exteriorly secured spider 250 which limits the extent of the movement.

The curvature of the valve and valve seats is not one of a relatively great value, the radii of the ball valve members being relatively large and of a value such as to provide a space therebetween sufficient to permit the desired expansion of the steam or like fluid therein to secure the prompt closure of the valves when the steam or like fluid begins to pass.

In this modification, the form of the valves has been changed from disks to spheres in order to provide a self-centering arrangement of the valves. In other respects, it is seen that the mode of operation is the same as in the first form described.

Another form of the invention is shown in Fig. 5. This device is preferably mounted in an outer shell like that shown at 130 in Figs. 2 and 4 but omitted from Fig. 5. It comprises a casing 335 having a suitable cover plate 357 in which are mounted two valves 343 and 344 connected by a stem 345. The upper valve 344 is adapted to cooperate with an outlet 342 and the lower valve with an outlet 349 which is slightly smaller in diameter at the uppermost part than the outlet 342, there being therefore as between the two, a net upward force from the static pressure within the casing tending to open the valves. The valves are accurately guided by a lower extension of the stem passing through an opening 356 in the lower part of the casing, and an upward extension of the stem passing through an opening in the spider 350 similar in general to the spider 150 shown in Figs. 2 and 3. The spider 350 rests on and is secured to the cover plate 357 which in turn is suitably secured to the main casing body as by a series of set screws, one of which is shown at 358.

The upper valve member 344 comprises a disk-like member similar to the disk 144 in Fig. 2. As in the previously described forms its spaced relation to the valve 349 and the respective outlets are such that when valve 349 is fully seated, that is, completely closed, the disk 344 remains spaced a slight distance from the opposed smooth flat surface 341 on the upper side of the plate 357. To assist in a smooth curved flow of the fluids a fillet 359 preferably is provided at the junction of the under surface of disk 344 and the valve stem. The construction may include a washer 360 on the valve stem between the disk 344 and the spider of a thickness selected to limit the valve opening to a desired extent and capable of being replaced by another of different thickness in accordance with the degree of permitted opening best suited to a particular set of conditions.

As noted above, the lower end of the valve stem has a close sliding fit in the opening 356 in the bottom of the casing. Escape of fluids through outlet 349 is permitted, however, through the counter bore 361 and a series of holes 362 located around and connecting the counter bore 361 with the exterior of the casing.

It will be understood that in each of the forms shown the relation of the elements and the relative dimensions will vary one with another and in accordance with the particular conditions of the installation. As an illustrative example, however, it is noted that in a device like that of Fig. 5 which gave good results in operation over a wide range of pressures, some of the more important dimensions were as follows: The lower valve outlet 349 at the extreme upper part where the diameter is the maximum measured about $\frac{17}{32}$ of an inch, and the diameter of the upper outlet 342 measured ⅝ of an inch. The diameter of the disk 344 was about 2½ inches and the space between it and the opposed surface 341 when the valves were in their lowermost position was about .005 inch. As noted, these figures are merely approximate and illustrative, and will be varied to suit the conditions in accordance with the principles of the invention herein disclosed. In general, the relation of the parts is such under the normal static pressure acting within the closed casing there will be a net resulting force tending to open the valves and release a non-expansible fluid when such is present, and that the valves will remain open while the non-expansible fluid continues to pass out the outlet 342 and under the disk 344 in Fig. 5, but when an expansible fluid begins to flow out this narrow passage the expansion and velocity of the expansible fluid produce a negative or reduced pressure under the disk with a total resultant force causing the valves to close and to remain closed so long as the fluid presented to the opening 342 is of the expansible character. There will be, of course, a very small leak of expansible fluid through this outlet 342 at all times when the valves occupy their extreme closed position but with proper proportioning in accordance with the conditions this will be practically negligible.

Since certain changes may be made in the construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a trap for separating non-expansible fluid from expansible fluid in combination, a casing to receive such fluids, two outlet openings therefrom, a valve for each of said openings connected together to operate in unison in the opening and closing directions, the relation of the valves to each other and to their respective openings being such that when one of said valves is closed the other remains open a small distance, and said other valve and its controlled passage being so arranged as to have a discharge passage of progressively increasing cross-sectional area extending for a relatively large distance permitting the expansion of expansible fluids escaping therethrough.

2. In a trap for separating non-expansible fluid from expansible fluid in combination, a casing adapted to be connected to receive such fluids, two outlet openings, a valve for each of said openings connected together to operate in unison in the opening and closing directions, the valves being so arranged that the pressure in said casing tends to close a first one of said valves and to open the other, the connection between said valves being such that when said first valve is closed said other valve is still open a small distance and said other valve being provided with a discharge passage in which escaping expansible fluid is permitted to expand in its movement therethrough and to produce a reduced pressure under said other valve tending to close it.

3. In a trap device adapted for separating non-expansible fluids from expansible fluids, the combination with a chambered member connected to receive a mixture of such fluids and having opposite walls provided with openings, an outer valve member to control one of said openings, an inner valve member to control the other of said openings, and means for causing said valve members to move in unison, the pressure in said chamber tending to open said first valve from closed position and tending to maintain said second valve in closed position when closed, and said first valve when opened to passage of an expansible fluid being subject to closing pressure against a relatively reduced pressure caused by expansion of said expansible fluid.

4. A trap for separating non-expansible fluid from expansible fluid, comprising a casing adapted to be connected to receive such fluids, two outlet openings, a valve for each of said openings connected together to operate in unison in the closing and opening directions, the valves being so arranged that fluid pressure in said casing tends to close a first one of said valves and to open the other of said valves, the outlet for said other valve being slightly larger than the outlet for said first valve so that the static pressure of fluids in the casing tends to open said valves, but said other valve being provided with a discharge passage in which escaping expansible fluid is permitted to expand in its movement therethrough and produces a reduced pressure under said other valve and the total force in said valves in such case tends to move the valves to closed position.

5. A trap for separating non-expansible fluid from expansible fluid, comprising a casing adapted to be connected to receive such fluids, two outlet openings, an outwardly opening valve for a first one of said outlets and an inwardly opening valve for the other of said outlets connected together to operate in unison, but the connection being such that when said first outlet is completely closed said other outlet is still open a small distance, said first outlet being slightly larger than said other outlet so that the static pressure in said casing tends to open said valves, the escape passage through said other valve however being such that it will remain open for the release of non-expansible fluid but permits expansible fluid to expand in its movement therethrough and produces a reduced pressure underneath said other valve and a resulting total force tending to close the valves.

ALGERNON R. BURNETTE.